United States Patent
Radostitz

(10) Patent No.: US 9,218,673 B2
(45) Date of Patent: Dec. 22, 2015

(54) METHOD AND SYSTEM FOR MANIPULATING CAMERA LIGHT SPECTRUM FOR SAMPLE ARTICLE FALSE COLOR RENDERING

(71) Applicant: Vince Radostitz, Beaverton, OR (US)

(72) Inventor: Vince Radostitz, Beaverton, OR (US)

(73) Assignee: NIKE, INC., Beaverton, OR (US)

( * ) Notice: Subject to any disclaimer, the term of this patent is extended or adjusted under 35 U.S.C. 154(b) by 100 days.

(21) Appl. No.: 13/649,665

(22) Filed: Oct. 11, 2012

(65) Prior Publication Data

US 2014/0104292 A1 Apr. 17, 2014

(51) Int. Cl.
| | |
|---|---|
| *G09G 5/00* | (2006.01) |
| *G09G 3/30* | (2006.01) |
| *G09G 5/10* | (2006.01) |
| *G06T 15/50* | (2011.01) |
| *H04N 5/225* | (2006.01) |
| *H04N 9/73* | (2006.01) |
| *H04N 7/00* | (2011.01) |
| *H04N 1/46* | (2006.01) |
| *H04N 1/40* | (2006.01) |
| *G06K 9/00* | (2006.01) |
| *G06K 9/40* | (2006.01) |
| *G06F 15/16* | (2006.01) |

(Continued)

(52) U.S. Cl.
CPC .............. *G06T 11/001* (2013.01); *H04N 5/33* (2013.01); *H04N 5/332* (2013.01)

(58) Field of Classification Search
USPC ......... 345/426, 581, 589, 594, 619, 690, 214, 345/20, 48, 63, 77, 84; 348/162, 207.1, 348/207.11, 207.99, 22.1, 223.1, 273, 552; 358/501, 509, 512, 515–516, 518, 448, 358/461, 537–538, 452–453; 382/162–163, 382/167, 254, 260, 274, 276; 709/201, 203, 709/217–219; 715/700, 733, 740
See application file for complete search history.

(56) References Cited

U.S. PATENT DOCUMENTS

| | | |
|---|---|---|
| 5,463,480 A | 10/1995 | MacDonald et al. |
| 6,140,997 A | 10/2000 | Tanaka |

(Continued)

FOREIGN PATENT DOCUMENTS

| | | |
|---|---|---|
| EP | 1 351 172 A1 | 10/2003 |
| EP | 1 465 415 A1 | 10/2004 |
| WO | 2011132241 A1 | 10/2011 |

OTHER PUBLICATIONS

International Search Report and Written Opinion dated Mar. 3, 2014 cited in PCT/US2013/064002.
Dimeji Ibitayo, "Infrared Imaging of Power Electronic Components", Army Research Laboratory, ARL-TR-3690, Dec. 2005, Adelphi, MD.

(Continued)

*Primary Examiner* — Wesner Sajous
(74) *Attorney, Agent, or Firm* — Quinn Law Group, PLLC

(57) ABSTRACT

A system and method for obtaining image information of features of a sample article using non-visible light is described. In one embodiment, a visible light filter is used on a camera to block out the visible light spectrum. The non-visible light is used to generate a colorless image of the sample article that includes the features of the sample article without the color information. Subsequent false color rendering of all or portions of the colorless image can be used to generate a visual representation of the sample article having a desired false color. The false color rendering of the sample article can be used in a catalog, brochure, website, advertisement, or any other publication or visual presentation.

15 Claims, 10 Drawing Sheets

(51) Int. Cl.
*G06T 11/00* (2006.01)
*H04N 5/33* (2006.01)

(56) References Cited

U.S. PATENT DOCUMENTS

| | | | |
|---|---|---|---|
| 6,792,136 | B1 | 9/2004 | Niesen |
| 6,985,524 | B1 | 1/2006 | Borchers |
| 7,233,338 | B2 | 6/2007 | Orihara |
| 2003/0158788 | A1 | 8/2003 | Turpin et al. |
| 2006/0203339 | A1* | 9/2006 | Kleinberger et al. ......... 359/465 |
| 2009/0115721 | A1* | 5/2009 | Aull et al. ..................... 345/156 |
| 2009/0159799 | A1* | 6/2009 | Copeland et al. .......... 250/338.1 |
| 2010/0302376 | A1* | 12/2010 | Boulanger et al. ............ 348/164 |
| 2013/0002882 | A1 | 1/2013 | Onozawa et al. |

OTHER PUBLICATIONS

Stan Z. Li et al., "Illumination Invariant Face Recognition Using Near-Infrared Images", IEEE Transactions on Pattern Analysis and Machine Intelligence, Apr. 2007, pp. 627-639, vol. 29, No. 4, Los Alamitos, CA, US.

Christopher Gauge et al., "Automated Colorization of Grayscale Images Using Texture Descriptors and a Modified Fuzzy C-Means Clustering", Journal of Intelligent Learning Systems and Applications, Jan. 2012, pp. 135-143, vol. 4, No. 2.

Anat Levin et al., "Colorization Using Optimization", ACM Transactions on Graphics, Aug. 2004, pp. 689-694, vol. 23, No. 3.

International Preliminary Report on Patentability and Written Opinion of the International Searching Authority issued Apr. 14, 2015 in International Patent Application No. PCT/2013/064002.

* cited by examiner

METHOD AND SYSTEM FOR MANIPULATING CAMERA LIGHT SPECTRUM FOR SAMPLE ARTICLE FALSE COLOR RENDERING

BACKGROUND

The present invention relates generally to an imaging system for an article, and more specifically to a system and method of obtaining images of a sample article using non-visible light for subsequent false color rendering.

Conventionally, objects are photographed for display using visible light. Depending on the color of an object, certain features of the object may or may not be discernible from the photograph. For this reason, many prototypes or samples of objects are produced using grayscale colors so that the features of the object may be easily obtained with conventional equipment.

Therefore, there exists a need in the art for a method and a system that allows prototype and sample articles to be produced with any desired color, but still provides sufficient detail when image information is obtained for the article.

SUMMARY

In one aspect, the invention provides a method of processing image information associated with an article for visual presentation comprising: obtaining image information associated with the article from an imaging system using non-visible light; extracting one or more features of the article from the obtained image information; and generating a colorless image of the article for visual presentation.

In another aspect, the invention provides an imaging system for obtaining image information associated with an article for visual presentation, the imaging system comprising: a camera for obtaining image information associated with the article using non-visible light; and a computer configured to perform the steps of: extracting one or more features of the article from the obtained image information; and generating a colorless image of the article for visual presentation.

In another aspect, the invention provides a method of processing image information associated with an article for visual presentation comprising: producing an article having a non-grayscale color; obtaining image information associated with the article from an imaging system using non-visible light; extracting one or more features of the article from the obtained image information, wherein the features of the article include at least a shape, a size, a plurality of edges, a depth, a shading, and a texture associated with the article; and generating a colorless image of the article for visual presentation.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
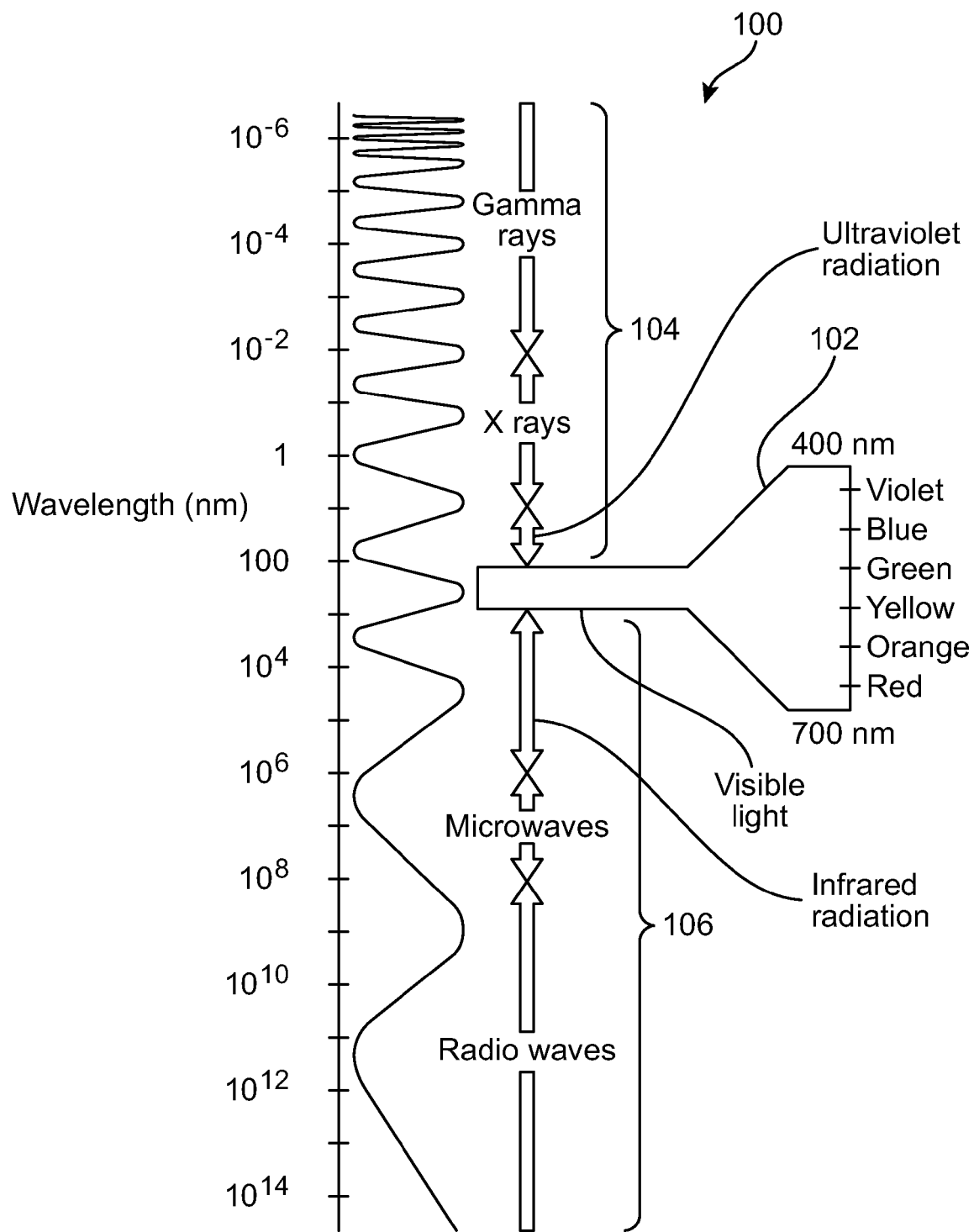
FIG. 1 is a representational view of the electromagnetic spectrum.

FIG. 1 is a representational view of the electromagnetic spectrum. The electromagnetic spectrum includes radiation having wavelengths that range from very large to very small. As shown in FIG. 1, electromagnetic spectrum 100 includes radiation in the form of radio waves that are associated with very large wavelengths at one end of electromagnetic spectrum 100 and radiation in the form of gamma rays that are associated with very small wavelengths at the other end of electromagnetic spectrum 100.

In between these two extremes of electromagnetic spectrum 100 lies a portion that is associated with visible light 102. Visible light 102 is the portion of electromagnetic spectrum 100 that includes radiation or light that is visible to the human eye. Visible light 102 ranges in wavelength from approximately 400 nanometers (nm) to approximately 700 nm. Further, visible light 102 includes a range of perceived colors that are typically associated with specific wavelengths within the spectrum range of visible light 102. These perceived colors include red, orange, yellow, green, blue, and violet.

Electromagnetic spectrum 100 further includes non-visible light that lies outside of the range of electromagnetic spectrum 100 associated with visible light 102. Non-visible light includes a short wavelength portion 104 that is associated with radiation having wavelengths that are shorter than visible light 102, including radiation just outside the range of wavelengths associated with visible light 102, for example, ultraviolet radiation, as well as other forms of radiation with shorter wavelengths, such as x-rays or gamma rays. Non-visible light further includes a long wavelength portion 106 that is associated with radiation having wavelengths that are longer than visible light 102, including radiation just outside the range of wavelengths associated with visible light 102, for example, infrared radiation, as well as other forms of radiation with longer wavelengths, such as microwaves or radio waves. As used herein and throughout the claims, the term "non-visible light" refers to any portion of radiation in electromagnetic spectrum 100 that is not associated with visible light 102, including any radiation having a wavelength within short wavelength portion 104 and/or long wavelength portion 106.

The perceived color of objects depends on the interaction of the object with the various wavelengths of visible light 102. Typically, an object will absorb and reflect different portions of the spectrum of visible light 102. Based on the specific wavelengths of visible light 102 that are absorbed and reflected, an object is perceived as having a specific perceived color. For example, a white object reflects most of the wavelengths of visible light 102, whereas a black object absorbs most of the wavelengths of visible light 102. Similarly, objects having a perceived color generally reflect wavelengths of visible light 102 that are associated with that perceived color.

In addition, characteristics of an object may affect the way in which certain wavelengths of visible light 102 interact with the object. For example, pigments and dyes may contain molecules that absorb and/or reflect specific wavelengths of visible light 102 in order to generate a given perceived color. Accordingly, an object treated with such pigments or dyes may be perceived as having the color associated with the pigment or dye.

Given these properties of objects, different colors may be selected for an object for different purposes. For example, the color of an object may be selected for the purpose of being easily visible or being easily photographed. For example, in the case of articles, including articles of footwear, articles of sports equipment, and/or articles of apparel, a sample article may be produced with a specific color that is selected for the purpose of easily obtaining an image of the object that may be used for creating false color renderings of the sample in a variety of different colors according to a consumer or user preference. A sample article may be a prototype or early production of a proposed final configuration of a retail product that is made for the purposes of demonstrating a new article to potential purchasers and/or vendors before mass production of the article has begun or before the article has generally gone on sale to the public.

The sample article is generally produced using a color that is selected so that an image of the sample article is easily obtainable using a conventional imaging system, such as a camera. For example, in many cases, a prototype will be produced in a grayscale color or a variation thereof. Accordingly, the grayscale color may allow details of the sample article to be easily obtainable using a conventional camera, whereas a different color may not allow sufficient details to be obtained.

Figure 2:
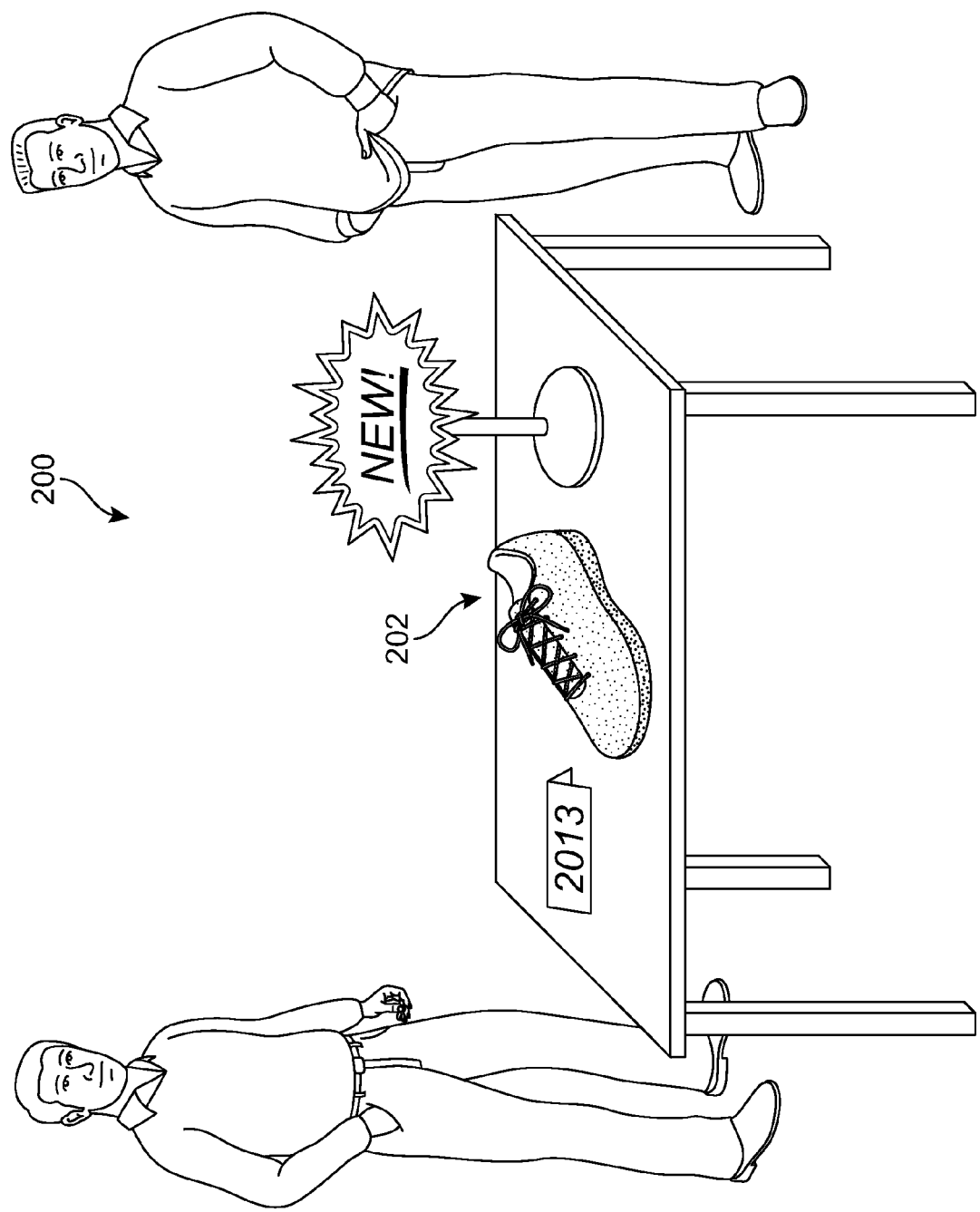
FIG. 2 is a schematic view of an exemplary embodiment of a sample of an article of footwear on display.

Referring now to FIG. 2, a schematic view of an exemplary embodiment of a sample of an article of footwear on display is illustrated. In some embodiments, a display 200 of a sample article of footwear 202, also referred to as simply sample article 202, may be made to demonstrate a new retail product to one or more persons, including potential purchasers and/or vendors. In an exemplary embodiment, sample article 202 included on display 200 may be produced with a non-grayscale color. With this arrangement, sample article 202 may be provided with a more visually appealing aesthetic appearance than a sample article that is produced with a grayscale color. Accordingly, sample article 202 in a non-grayscale color may be configured to capture and/or attract more attention while on display 200.

In this embodiment, sample article 202 is configured as an athletic shoe. In other embodiments, a sample article may be any type of article of footwear. In still other embodiments, any type of article may be used, including, but not limited to articles of apparel and articles of equipment, such as sports equipment. The principles described in the present embodiments can be applied to any suitable article that is configured to be displayed.

In some embodiments, sample article 202 may also be configured for obtaining an image of the article that may be used for creating false color renderings of sample article 202 in a variety of different colors according to a consumer or user preference, for example, for use in a catalog, brochure, website, advertisement, and/or any other publication or visual presentation. As discussed above, however, sample article 202 in a non-grayscale color may not allow sufficient details to be obtained using a conventional imaging system.

Figure 3:
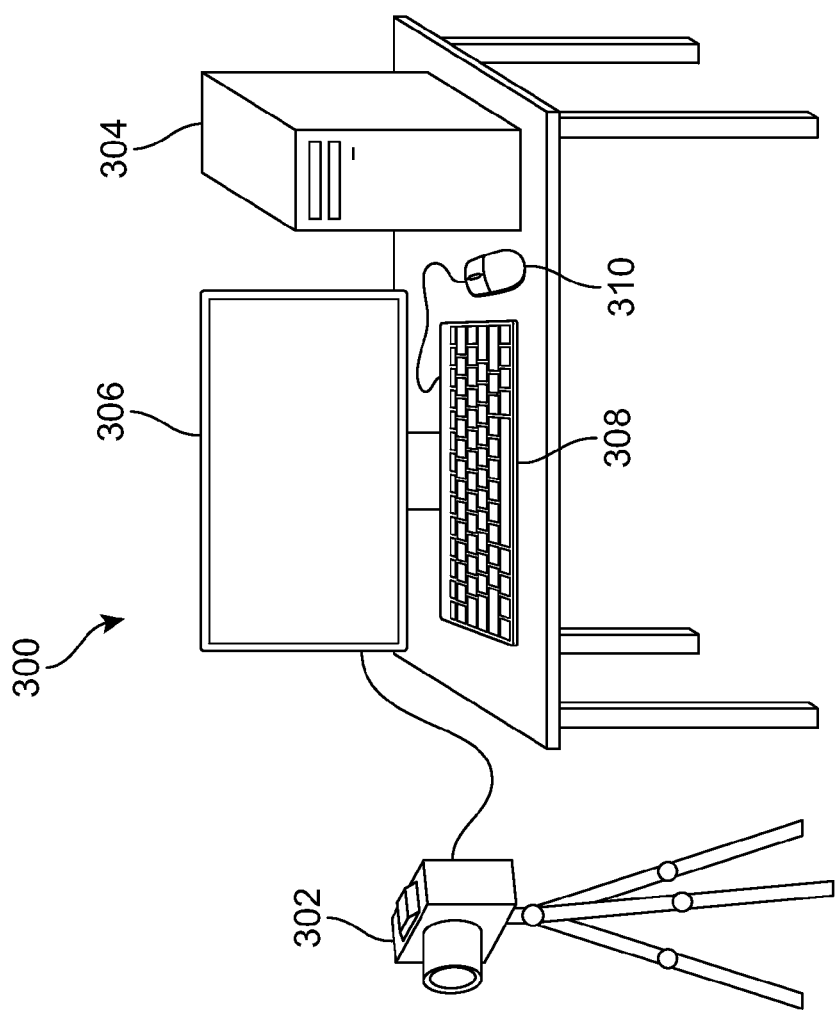
FIG. 3 is a schematic view of an exemplary embodiment of a sample article imaging system.
Figure 3:
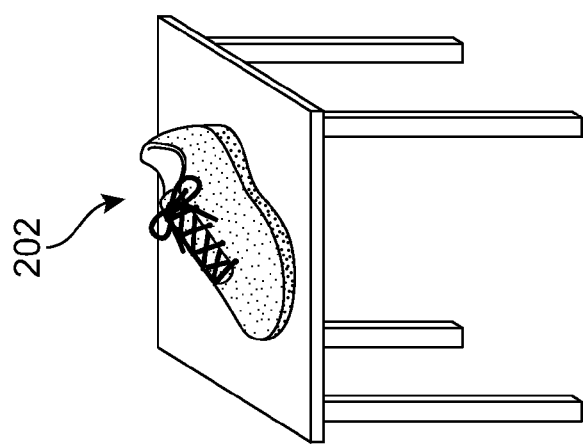

In some embodiments, an imaging system may include one or more components for manipulating camera light spectrum for sample article false color rendering. Referring now to FIG. 3, an exemplary embodiment of an imaging system 300 for manipulating camera light spectrum is illustrated. In an exemplary embodiment, imaging system 300 may include a number of components that are configured for obtaining an image of sample article 202. Different embodiments of imaging system 300 may include different components. Any of the following components associated with imaging system 300 may be considered optional in some embodiments. Some embodiments may include a given component, while others may exclude it. The following description discloses many of the possible components that may be used with imaging system 300, however, it should be kept in mind that not every component must be used in a given embodiment.

In an exemplary embodiment, imaging system 300 may include one or more cameras that are configured to obtain an image or images of sample article 202. In one embodiment, imaging system 300 may include a camera 302 that may be used to obtain one or more images of sample article 202. In other embodiments, imaging system 300 may further include additional cameras that are configured to obtain images of sample article 202 from different viewing angles, including from multiple viewing angles so as to allow a three-dimensional image to be generated of sample article 202.

In different embodiments, camera 302 may be any suitable type of camera, including a professional camera or a consumer camera available to purchase at a retail store. In addition, in various embodiments, camera 302 may be a high-resolution camera capable of obtaining high-definition images or may be a camera of any resolution capable of obtaining images of sample article 202 with a desired quality and/or resolution.

In other embodiments, camera 302 may include one or more detectors that are configured to obtain image information or other data associated with different wavelengths of non-visible light. For example, a detector that is configured to receive x-rays or microwaves may be used to obtain image information or other data associated with the sample image from the respective portions of the electromagnetic spectrum associated with the corresponding wavelengths for x-rays or microwaves. With this arrangement, a suitable detector may be provided for imaging system 300 to obtain image information of a sample article that is associated with different non-visible light wavelengths within the electromagnetic spectrum.

In some embodiments, imaging system 300 may include a computer 304. In various embodiments, computer 304 may include, but is not limited to: a desktop computer, portable computer, tablet computer, smartphone, and/or any other device including a processor. In some embodiments, computer 304 may be any processing device that is configured to control and/or communicate with one or more components of imaging system 300. In some embodiments, computer 304 may optionally include a display 306 that is configured to allow a user to view and/or interact with information from computer 304. In some embodiments, a user may use one or more input devices to interact with computer 304, including a keyboard 308 and/or a mouse 310. With this arrangement, a user of imaging system 300 may use computer 304 to view and/or interact with the images obtained from camera 302.

In some embodiments, computer 304 may be associated with imaging system 300 so as to transfer the obtained images from one or more components of imaging system 300 to computer 304. In an exemplary embodiment, images obtained from camera 302 may be transmitted to computer 304. In this embodiment, a connection may be provided to allow information transfer to and/or from computer 304 and various components of imaging system 300, including camera 302. The connection may be any type of connection used to transfer information between devices, including, but not limited to USB, Firewire, Ethernet, WiFi, Bluetooth, TCP/IP, as well as any other known wireless or wired connection type. In some cases, the connection may be part of a local area network (LAN). In other cases, computer 304 and additional components may be distant from each other and the connection may be part of a wide area network (WAN). In other embodiments, one or more components of imaging system 300 may be integrated with computer 304.

In some embodiments, imaging system 300 may include one or more additional components located locally or remote from computer 304 and/or imaging system 300. With this arrangement, computer 304 may be configured to transmit the obtained images, including images obtained from camera 302, to different locations. In some embodiments, a remote location may be in communication with imaging system 300. The remote location may include a remote server or other computer that may assist computer 304 with storing data, processing the obtained images, and/or performing additional processing, as well as providing additional information that may be relevant to a user of imaging system 300.

In other embodiments, computer 304 may be further configured to transfer or transmit information onto a storage medium. The storage medium may be any known type of storage medium, including known magnetic or optical storage media, and may further include removable and/or portable media. For example, in some embodiments, the storage medium may include a portable memory card. In other embodiments, the storage medium may include one or more databases located on a server.

Figure 4:
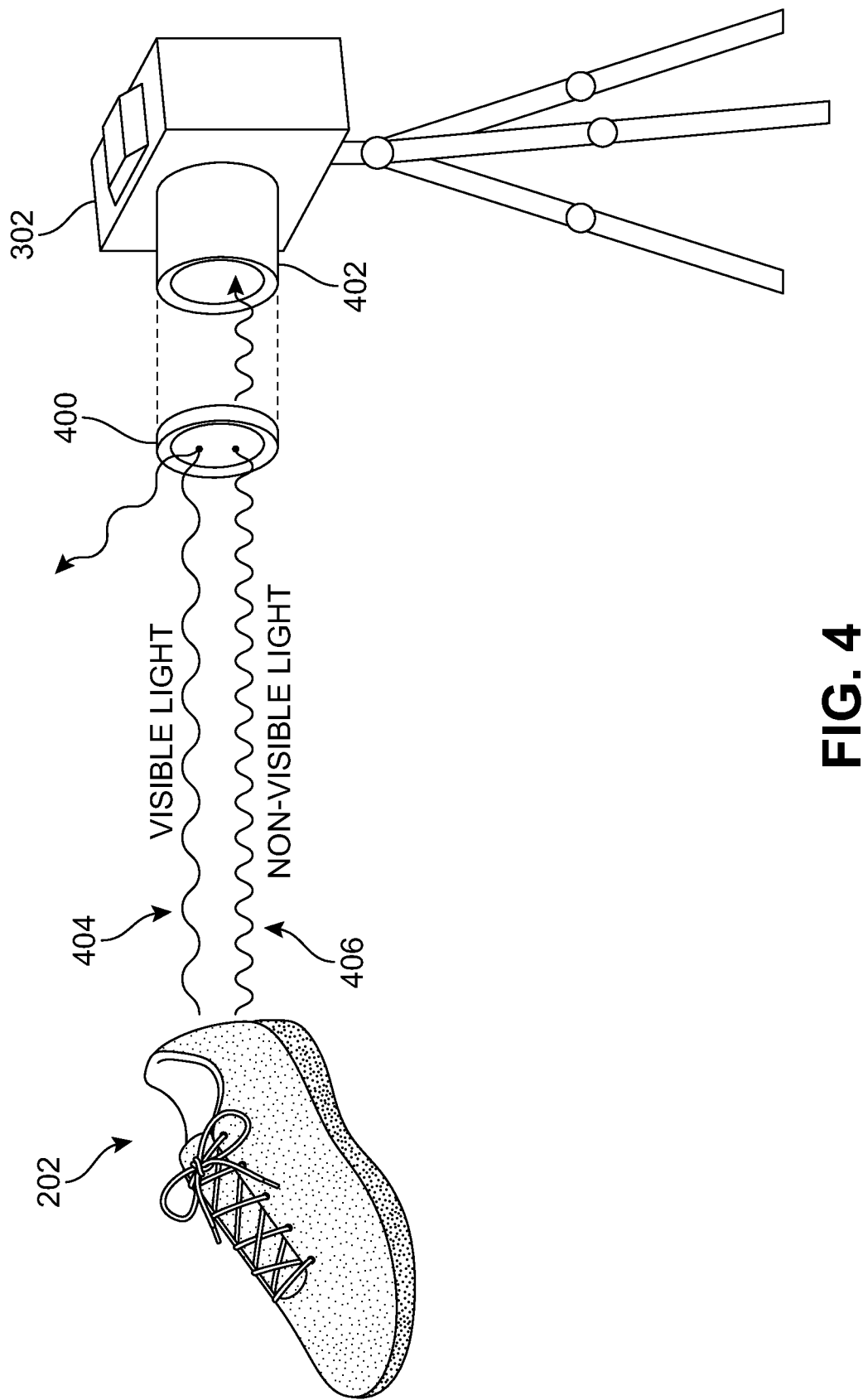
FIG. 4 is a schematic view of an exemplary embodiment of a sample article imaging system.

In some embodiments, imaging system 300 may include may include one or more components for manipulating the light spectrum obtained by camera 302 for generating false color renderings of sample article 202. Referring now to FIG. 4, an exemplary embodiment of a visible light filter 400 is illustrated for use with imaging system 300 and camera 302. In one embodiment, visible light filter 400 may be configured to block or filter out the visible light portion of the spectrum obtained by camera 302 that is associated with the image of sample article 202.

In this embodiment, visible light filter 400 is configured to block or filter out visible light portion 404 associated with the image of sample article 202, while allowing non-visible light portion 406 associated with the image of sample article 202 to pass through visible light filter 400 to a lens 402 of camera 302. With this arrangement, only the non-visible light from sample article 202 that is included within non-visible light portion 406 may be obtained by camera 302 to form the image of sample article 202. In some embodiments, visible light filter 400 may be any suitable filter that is configured to block or filter out substantially all, or a significant majority of, the visible light spectrum, including visible light portion 404.

In various embodiments, visible light filter 400 may be configured to allow different wavelengths of the non-visible light spectrum to pass through to lens 402. In some cases, visible light filter 400 may be configured to allow non-visible light portion 406 associated with wavelengths in the infrared portion of the electromagnetic spectrum to pass through (e.g., approximately 750 nm to $10^6$ nm), including only a portion of wavelengths associated with the infrared portion (e.g., smaller ranges within 750 nm to $10^6$ nm). In other cases, visible light filter 400 may be configured to allow non-visible light portion 406 associated with wavelengths in the ultraviolet portion of the electromagnetic spectrum to pass through (e.g., approximately 10 nm to 400 nm), including only a portion of wavelengths associated with the ultraviolet portion (e.g., smaller ranges within 10 nm to 400 nm). In still other cases, visible light filter 400 may be configured to allow non-visible light portion 406 associated with other wavelengths of the electromagnetic spectrum, discussed above, to pass through, including non-visible light associated with longer or shorter wavelengths than visible light spectrum 102 (e.g., approximately 400 nm to 700 nm).

Figure 5:
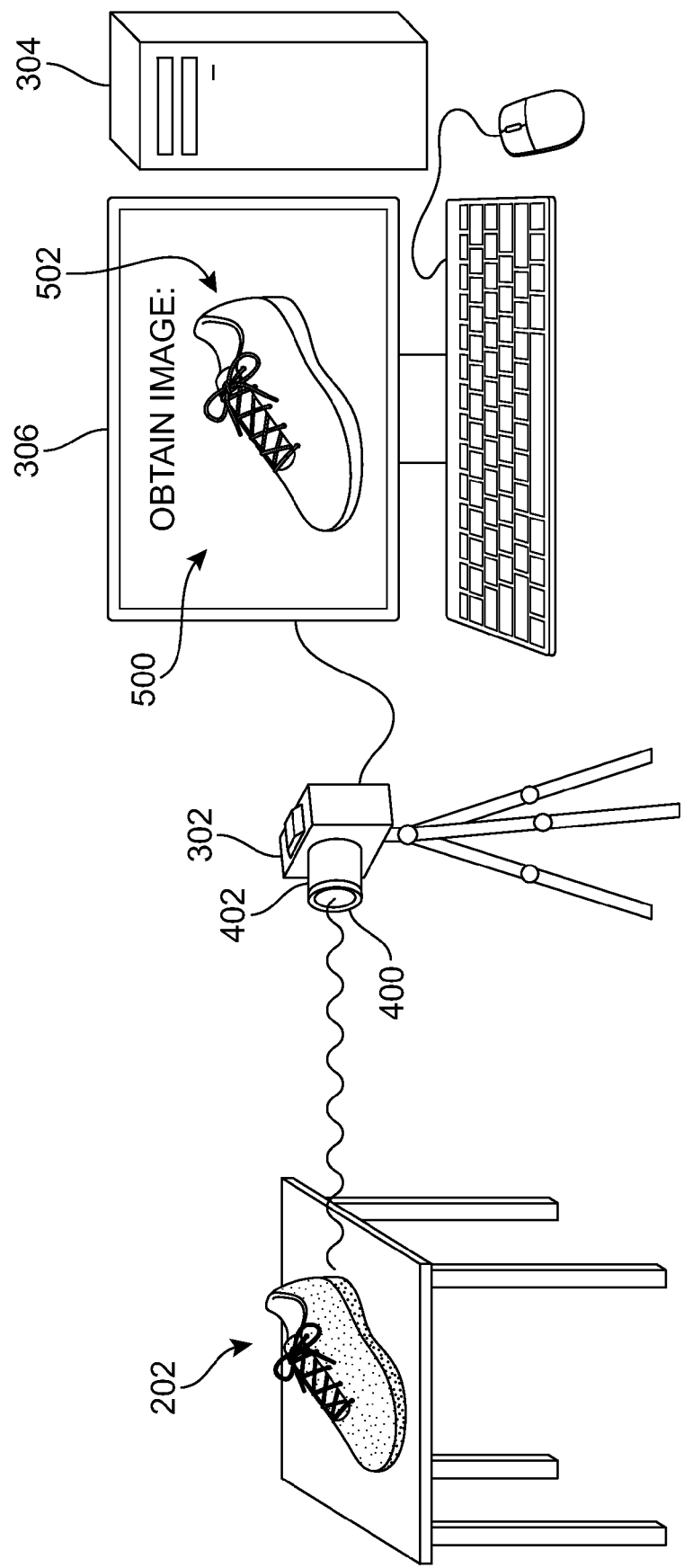
FIG. 5 is a schematic view of an exemplary embodiment of a sample article imaging system obtaining an image.

In some embodiments, imaging system 300, including one or more components for manipulating the light spectrum to obtain images of sample article 202 using non-visible light, may be used to obtain image information without color information associated with sample article 202. Referring now to FIG. 5, a schematic view of an exemplary embodiment of using visible light filter 400 with camera 302 to obtain images of sample article 202 using non-visible light is illustrated. In an exemplary embodiment, camera 302 fitted with visible light filter 400 may be used to obtain one or more images of sample article 202 which are communicated to computer 304 of imaging system 300.

In one embodiment, obtained image information 500 associated with sample article 202 may be displayed on display 306. In some embodiments, obtained image information 500 may include a colorless image 502 of sample article 202. In an exemplary embodiment, colorless image 502 includes the extracted features associated with sample article 202, for example, including, but not limited to: the shape, size, edges, depth, shading, texture, and/or other features associated with various portions of sample article 202, such as an upper and/or a sole, without including the color information associated with sample article 202 as it is perceived. In some embodiments, colorless image 502 may appear as an outline or colorless template of sample article 202. With this arrangement, sample article 202 may be produced in any desired color, while still allowing imaging system 300 to obtain the features associated with sample article 202 without regard for the color of sample article 202.

Figure 6:
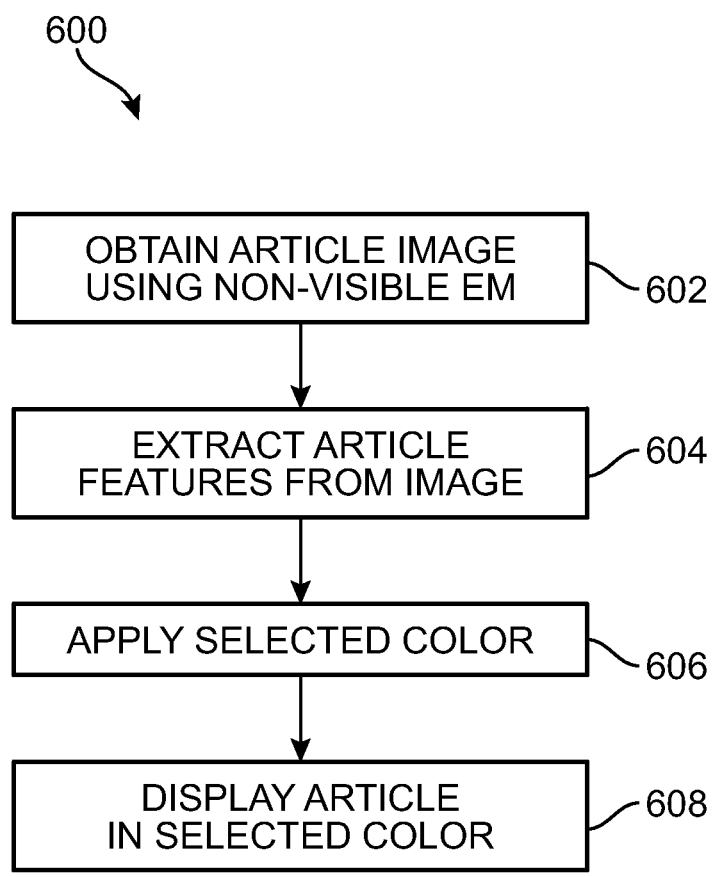
FIG. 6 is a representational view of an exemplary process for obtaining an image of a sample article and false color rendering.

In some embodiments, obtained image information 500, including colorless image 502, from imaging system 300 using non-visible light may be further used to create false color renderings of sample article 202. Referring now to FIG. 6, an exemplary embodiment of a process for obtaining a colorless image of a sample article and applying false color rendering. In some embodiments, an exemplary process 600 may be used to generate false color renderings of a sample article for displaying the sample article in a variety of different colors according to a consumer or user preference, for example, for use in a catalog, brochure, website, advertisement, and/or any other publication or visual presentation.

In some embodiments, process 600 may include one or more steps associated with a method of obtaining image information from a sample article using non-visible light, extracting features of the sample article from the image information, and applying a false color rendering of the sample article in a desired color, and displaying the rendering of the sample article with the false color applied for visual presentation. The order of the steps illustrated in FIG. 6 is exemplary and not required. In addition, in some embodiments, one or more steps of process 600 may be performed using a computer or processor, including one or more of computer 304 and/or a remote computer, described above. In different embodiments, process 600 may include additional steps not shown in FIG. 6.

In an exemplary embodiment, process 600 includes a first step 602 of obtaining image information from a sample article using non-visible light. For example, imaging system 300 may be used with visible light filter 400 to obtain image information associated with a sample article, as described above. Next, a second step 604 includes extracting features from the obtained image information to form a colorless image of the sample article, as described above. In some embodiments, the colorless image of the sample article extracted at second step 604 may be used to generate one or more false color renderings of the sample article.

At a third step 606, the colorless image of the sample article from second step 604 may have a desired false color rendering applied to one or more portions the colorless image that correspond to portions of the sample article. In an exemplary embodiment, an upper portion of the colorless image that corresponds to an upper of the sample article may have a desired false color rendering applied. In other embodiments, other portions of the colorless image corresponding to different portions of the sample article, including, but not limited to an upper or portions thereof, a midsole, an outsole, a lace or laces, a tongue, and/or any other portions of an article may similarly have a desired false color rendering applied.

In some cases, a single desired color may be selected for false color rendering of the colorless image. For example, an upper portion of the colorless image may have a desired false color rendering applied, while the remaining portions of the colorless image have a fixed or predetermined color applied. In other cases, multiple desired colors may be selected for false color renderings of portions of the colorless image. For example, one or more portions of the colorless image, such as an upper and/or a sole may have multiple desired false color renderings applied. In still other cases, different desired colors may be selected for false color renderings of different portions of the colorless image. For example, one portion of the colorless image, such as the upper, may have a first set of false colors available to apply to that portion of the colorless image, and a second portion of the colorless image, such as the sole, may have a second set of false colors available to apply to that portion. The first set and second set of false colors may include different colors, different numbers or colors, and/or different types or patterns of colors or color combinations/colorways.

In an exemplary embodiment, third step 606 may apply one or more desired false color renderings for displaying the sample article in a variety of different colors according to a consumer or user preference, for example, for use in a catalog, brochure, website, advertisement, and/or any other publication or visual presentation. Accordingly, after third step 606, at a fourth step 608, the colored rendering of the sample article with the selected desired false colors applied is displayed. In some embodiments, fourth step 608 may include displaying the colored rendering on a display screen, such as a computer monitor or other display device. In an exemplary embodiment, fourth step 608 may include preparing the colored rendering for being displayed on remotely located display screens, such as providing the colored rendering on a website or application for visual presentation. In other embodiments, fourth step 608 may include displaying the colored rendering on printed media, including, but not limited to catalogs, brochures, advertisements, and/or any other publication or visual presentation.

In some embodiments, one or more tools, including amateur or professional tools, may be used to assist with extracting features from the obtained image information, applying one or more desired false colors to the image, preparing or displaying a visual presentation of the image, and/or otherwise performing any processing on the image information at one or more steps of process 600, including any of first step 602, second step 604, third step 606, and/or fourth step 608. In one embodiment, tools may include any suitable programs, algorithms, or software available to one of ordinary skill in the art for creating, generating, editing, and/or preparing visual or graphical information for display or presentation.

Figure 7:
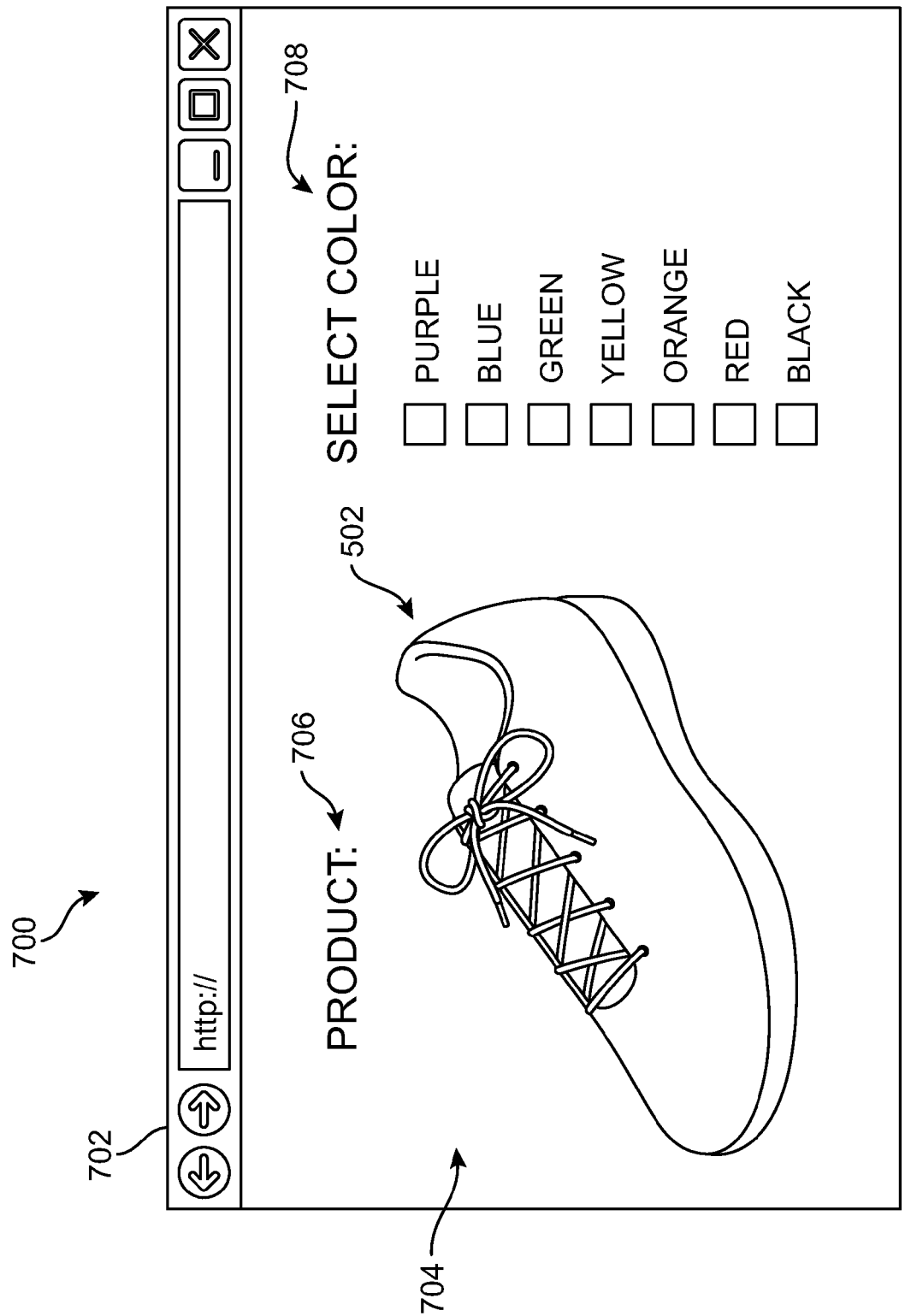
FIG. 7 is a representational view of an exemplary embodiment of a display screen for displaying an article image.
Figure 8:
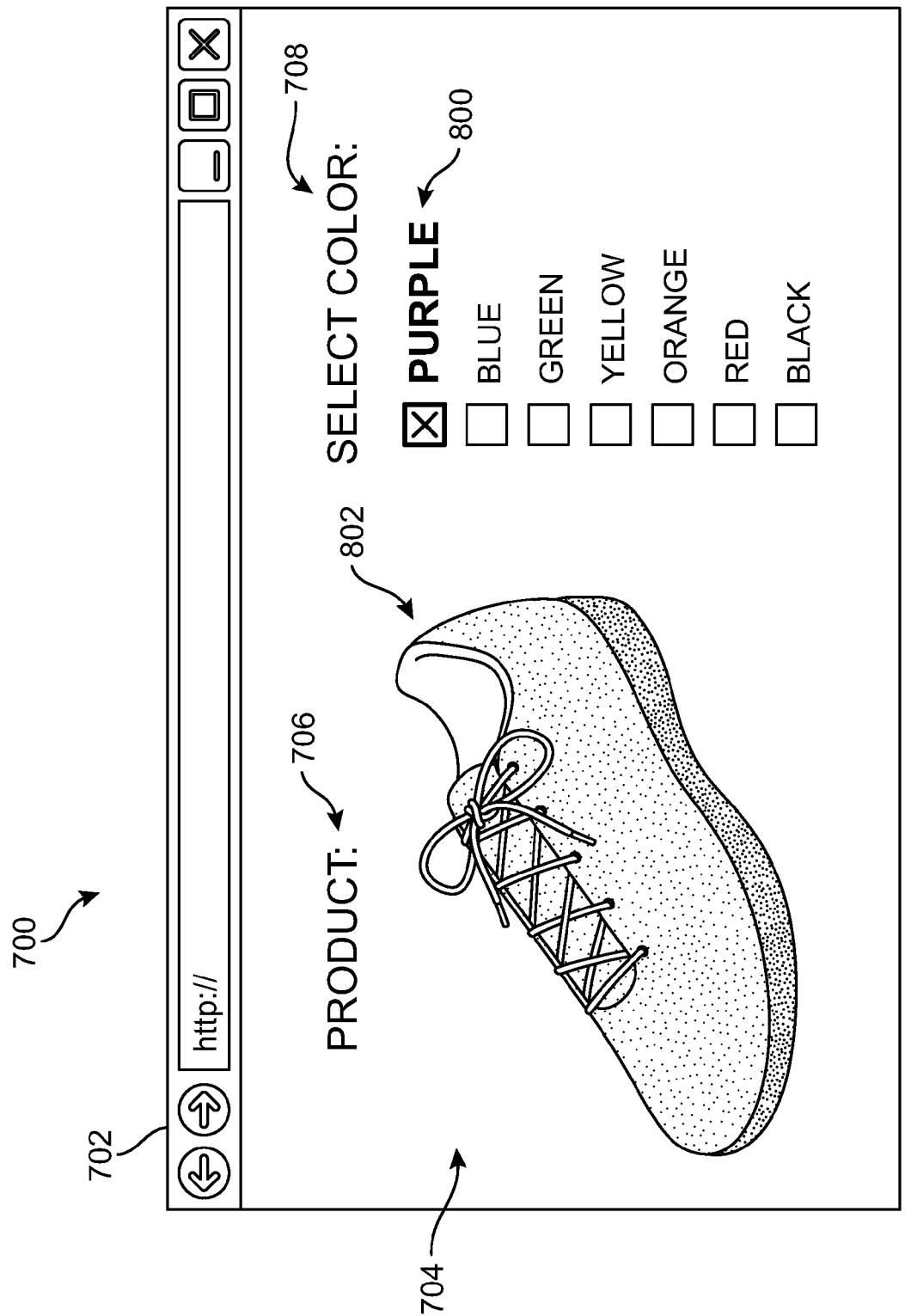
FIG. 8 is a representational view of an exemplary embodiment of a display screen for displaying an article image in a selected color.
Figure 9:
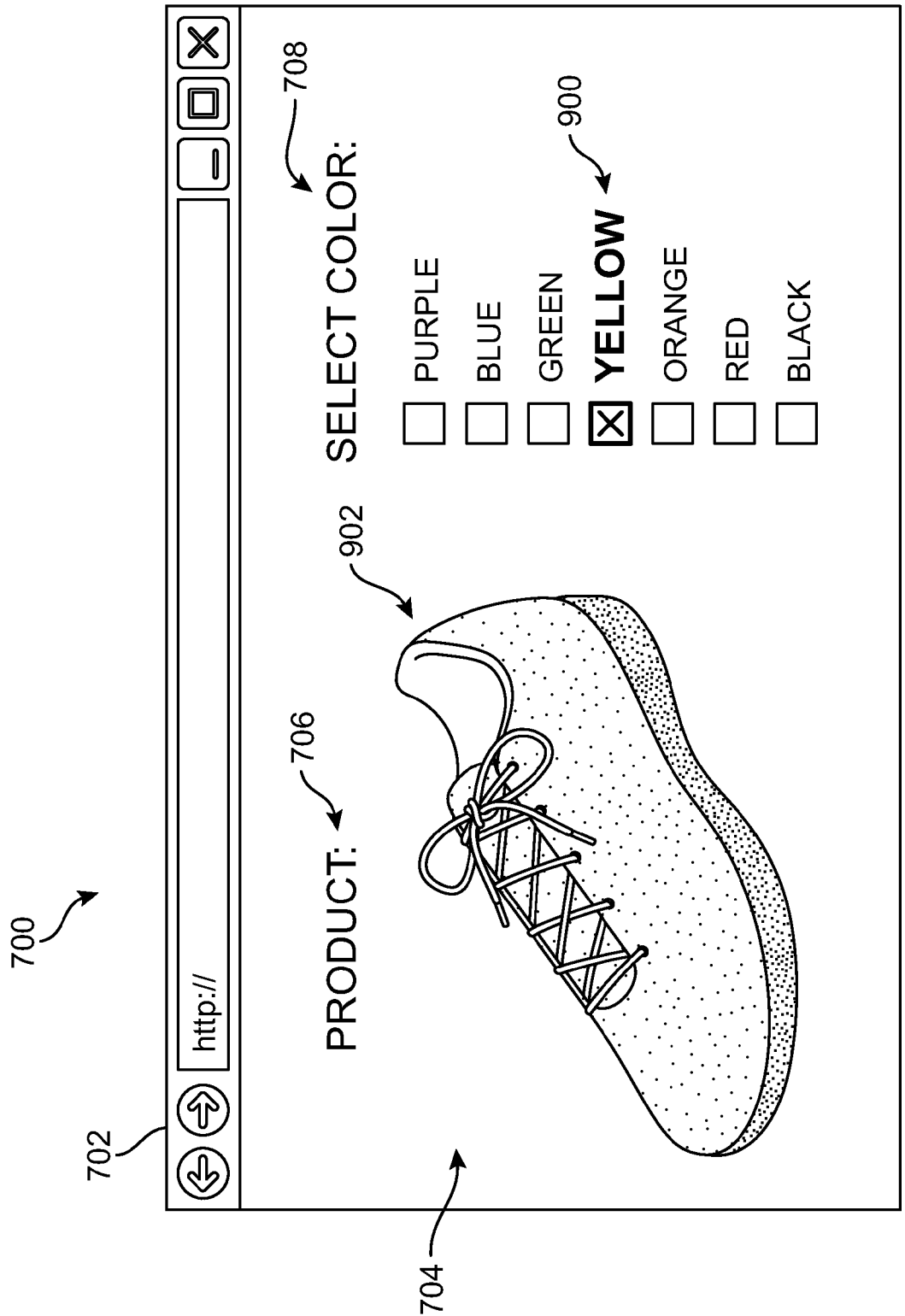
FIG. 9 is a representational view of an exemplary embodiment of a display screen for displaying an article image in a selected color.

FIGS. 7 through 9 illustrate an exemplary embodiment of process 600, including exemplary embodiments of third step 606 and/or fourth step 608, described above. In the embodiment of FIGS. 7 through 9, a sample article in the form of an athletic shoe is illustrated for visual presentation on a website over the internet. In other embodiments, a sample article may include any article or product for visual presentation according to any suitable method or media.

Referring now to FIG. 7, in some embodiments, an image of a sample article may be prepared for visual presentation on a website 700. In an exemplary embodiment, website 700 may be accessed by a user via a web browser 702 that is configured to display information to the user. In this embodiment, website 700 includes a visual presentation 704 of image information associated with a sample article, such as colorless image 502, discussed above. In some embodiments, website 700 may additionally provide other information to a user, including, but not limited to product description information 706. In an exemplary embodiment, website 700 may further include a selected color option 708 that is provided to a user of website 700.

In some embodiments, selected color option 708 may allow a user of website 700 to select one or more desired false color renderings for portions of colorless image 502 so that a colored rendering of the selected color or colors may be displayed. In this embodiment, a user may select between multiple colors, including, but not limited to: purple, blue, green, yellow, orange, red, and/or black. In other embodiments, however, any number or options of false color renderings may be provided as selected color option 708, including, but not limited to different colors, different colors for different portions of colorless image 502, and/or different types or patterns of colors or color combinations/colorways, as discussed above.

Referring now to FIGS. 8 and 9, two different embodiments of false color renderings of the sample article are illustrated based on different user-selected desired color options being applied to colorless image 502. In FIG. 8, a user has selected a purple 800 as selected color option 708. Accordingly, a first false color rendering 802 of the sample article with an upper having a purple color is applied to colorless image 502, for example, as described with reference to process 600 above, and is displayed to the user as visual presentation 704 on website 700.

In FIG. 9, a user has selected a different color option than in FIG. 8. In this embodiment, yellow 900 has been selected by the user as selected color option 708. Accordingly, a second false color rendering 902 of the sample article with an upper having a yellow color is applied to colorless image 502 and is displayed to the user as visual presentation 704 on website 700. In this embodiment, first false color rendering 802 and second false color rendering 902 have been generated as visual presentation 704 by using the same colorless image 502 and applying the desired false color selected by the user as selected color option 708.

In other embodiments, a user may make additional or different selections of false colors for various portions of colorless image 502 that correspond to various portions of the sample article to generate a visual presentation of a false color rendering of the sample article that has the desired false colors at the selected portions, as described above.

Figure 10:
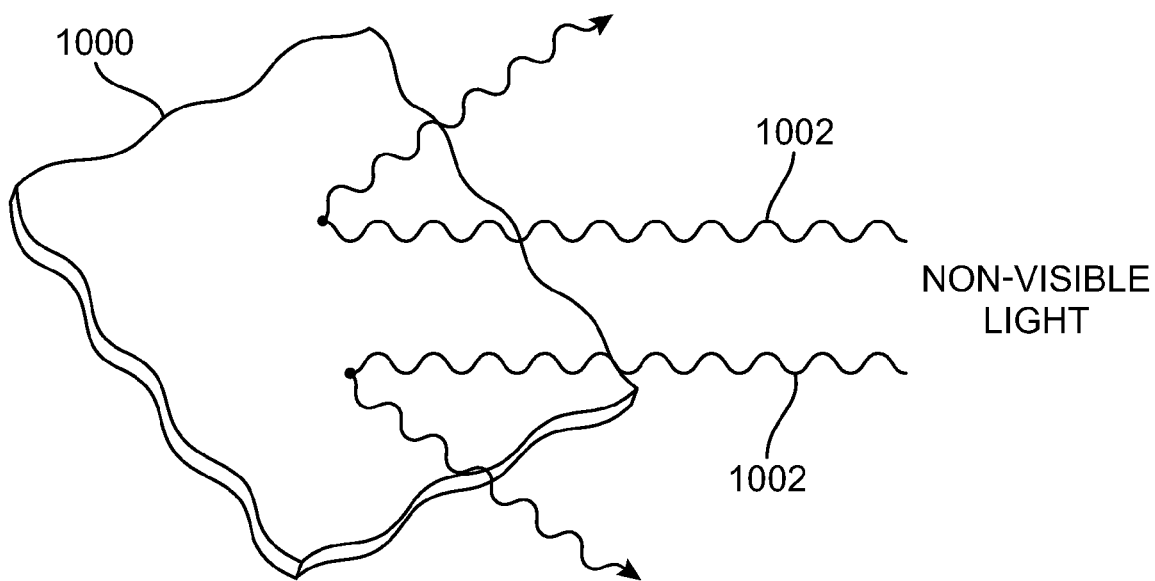
FIG. 10 is a schematic view of an alternate embodiment for manipulating camera light spectrum.
Figure 11:
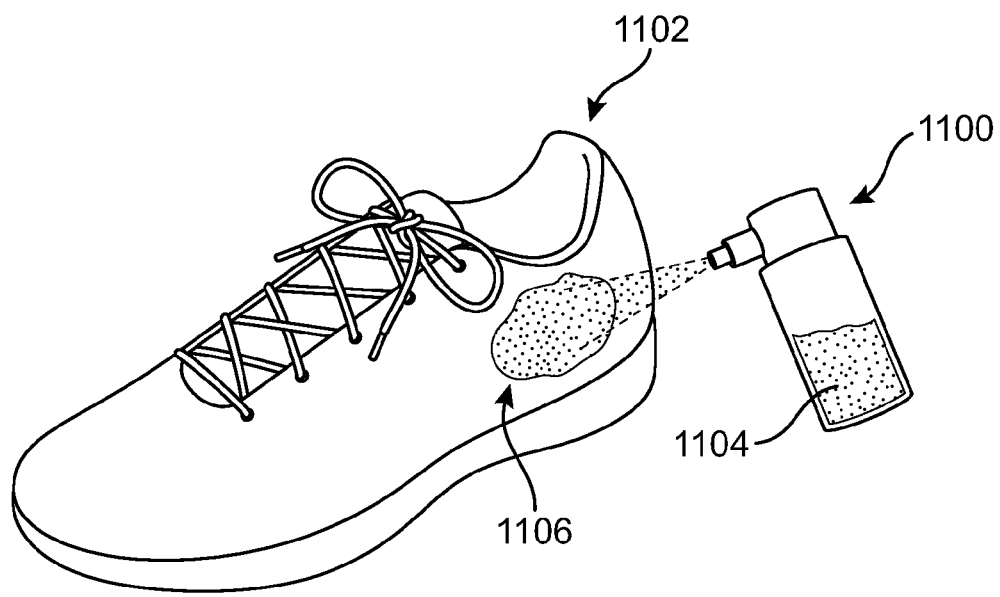
FIG. 11 is a schematic view of an alternate embodiment for manipulating camera light spectrum.

In some embodiments, a sample article may include elements that are configured to improve and/or increase the quality or resolution of image information obtained using non-visible light. FIGS. 10 and 11 illustrate alternate embodiments for manipulating camera light spectrum. In some cases, the alternate embodiments of FIGS. 10 and 11 may be used in combination with visible light filter 400, described above, to further assist with obtaining image information of a sample article using non-visible light. In other cases, the alternate embodiments of FIGS. 10 and 11 may be used as alternatives to visible light filter 400 for manipulating camera light spectrum to obtain image information of a sample article using non-visible light.

Referring now to FIG. 10, in this embodiment, a material 1000 that is configured to reflect a portion of non-visible light spectrum 1002 may be used to produce one or more portions of a sample article. For example, material 1000 may be used to produce an upper of the sample article. When obtaining image information of the sample article having an upper made from material 1000, non-visible light spectrum 1002 may be reflected by material 1000, causing the features of the sample article to be more easily obtained in the image information. In an exemplary embodiment, material 1000 may be a material that is configured to reflect at least a portion of non-visible light spectrum 1002, including, but not limited to a material that reflects ultraviolet light and/or infrared light. In other embodiments, material 1000 may be chosen to reflect a different portion of non-visible light spectrum 1002 based on the type of camera or other detector that is being used to obtain the image information associated with the sample image.

Referring now to FIG. 11, in this embodiment, a sprayer 1100 may be configured to treat a sample article 1102 with a coating material 1104. In some embodiments, coating material 1104 may be configured to reflect a portion of the non-visible light spectrum. In an exemplary embodiment, sprayer 1100 may be configured to apply coating material 1104 to one or more portions of sample article 1102. For example, coating material 1104 may be sprayed onto an upper 1106 of sample article 1102. With this arrangement, when obtaining image information of sample article 1102 that has been treated with coating material 1104 using sprayer 1100, the non-visible light spectrum may be reflected by coating material 1104, causing the features of sample article 1102 to be more easily obtained in the image information. In an exemplary embodiment, coating material 1104 may be a material that is configured to reflect at least a portion of the non-visible light spectrum, including, but not limited to a material that reflects ultraviolet light and/or infrared light. In other embodiments, coating material 1104 may be chosen to reflect a different portion of the non-visible light spectrum based on the type of camera or other detector that is being used to obtain the image information associated with the sample image.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of processing image information associated with a non-grayscale article for visual presentation comprising:
   capturing a single image of non-visible light image information associated with the non-grayscale article using an imaging system that filters ambient visible light and passes through ambient non-visible light, wherein the imaging system has only one camera for capturing the single image from the ambient non-visible light;
   obtaining the single image of non-visible light image information associated with the non-grayscale article from the imaging system;
   extracting one or more features of the article from the single image of non-visible light image information; and
   generating a colorless image from the single image non-visible light image information of the non-grayscale article for visual presentation; and
   displaying the colorless image of the non-grayscale article.

2. The method according to claim 1, wherein the step of capturing non-visible light image information comprises using a visible light filter on the one camera to block out substantially all wavelengths associated with visible light.

3. The method according to claim 1, wherein the colorless image of the non-grayscale article does not include the non-grayscale color.

4. The method according to claim 1, further comprising:
   selecting at least one false color for a false color rendering of the non-grayscale article; and
   applying the at least one false color to the colorless image to generate the false color rendering of the non-grayscale article for visual presentation.

5. The method according to claim 1, wherein the visual presentation includes at least one of a printed publication and a website.

6. An imaging system for obtaining image information associated with a non-grayscale article for visual presentation, the imaging system comprising:
   a single camera for obtaining image information associated with the non-grayscale article using ambient non-visible light, wherein the single camera includes a lens, and wherein the image information is contained in a single image;
   a visible light filter associated with the single camera, wherein the filter is configured to block substantially all ambient visible light from the lens of the single camera; and
   a computer configured to receive the obtained image information from the single image and configured to perform the steps of:
      extracting one or more features of the non-grayscale article from the obtained image information from the single image; and
      generating a colorless image from the single image of the non-grayscale article obtained by the single camera for visual presentation.

7. The imaging system according to claim 6, further comprising at least one display screen associated with the computer, wherein the computer is further configured to prepare the colorless image of the non-grayscale article for visual presentation on the at least one display screen.

8. The imaging system according to claim 7, wherein the visual presentation includes a website.

9. The imaging system according to claim 6, wherein the computer is further configured to apply at least one false color to the colorless image to generate a false color rendering of the non-grayscale article for visual presentation.

10. The imaging system according to claim 9, wherein a selection of the at least one false color is received by the computer from a user at a remote location from the computer.

11. A method of processing image information associated with an article for visual presentation comprising:
   producing an article having a non-grayscale color;
   obtaining a single image of the article from an imaging system using ambient non-visible light by filtering visible light using a visible light filter associated with the imaging system, wherein the imaging system has only one camera for obtaining the single image;
   extracting one or more features of the article from the obtained single image, wherein the features of the article include at least a shape, a size, a plurality of edges, a depth, a shading, and a texture associated with the article; and
   generating a colorless image of the article from the single image obtained by the one camera for visual presentation.

12. The method according to claim 11, further comprising:
   selecting at least one portion of the colorless image;
   selecting at least one false color; and
   generating a false color rendering of the article having the selected at least one false color applied to the selected at least one portion of the colorless image.

13. The method according to claim 12, wherein the article is an article of footwear; and wherein the selected at least one portion of the colorless image corresponds to at least one of a portion of an upper, a midsole, an outsole, a lace, and a tongue of the article of footwear.

14. The method according to claim 11, wherein the visual presentation includes at least one of a printed publication and a website.

15. The method according to claim 11, wherein obtaining image information using non-visible light further comprises at least one of:
   applying a coating material to a portion of the article that reflects at least a portion of non-visible light; and
   using a material that reflects at least a portion of non-visible light to produce at least a portion of the article.

* * * * *